BILL P. COOPER
*INVENTOR.*

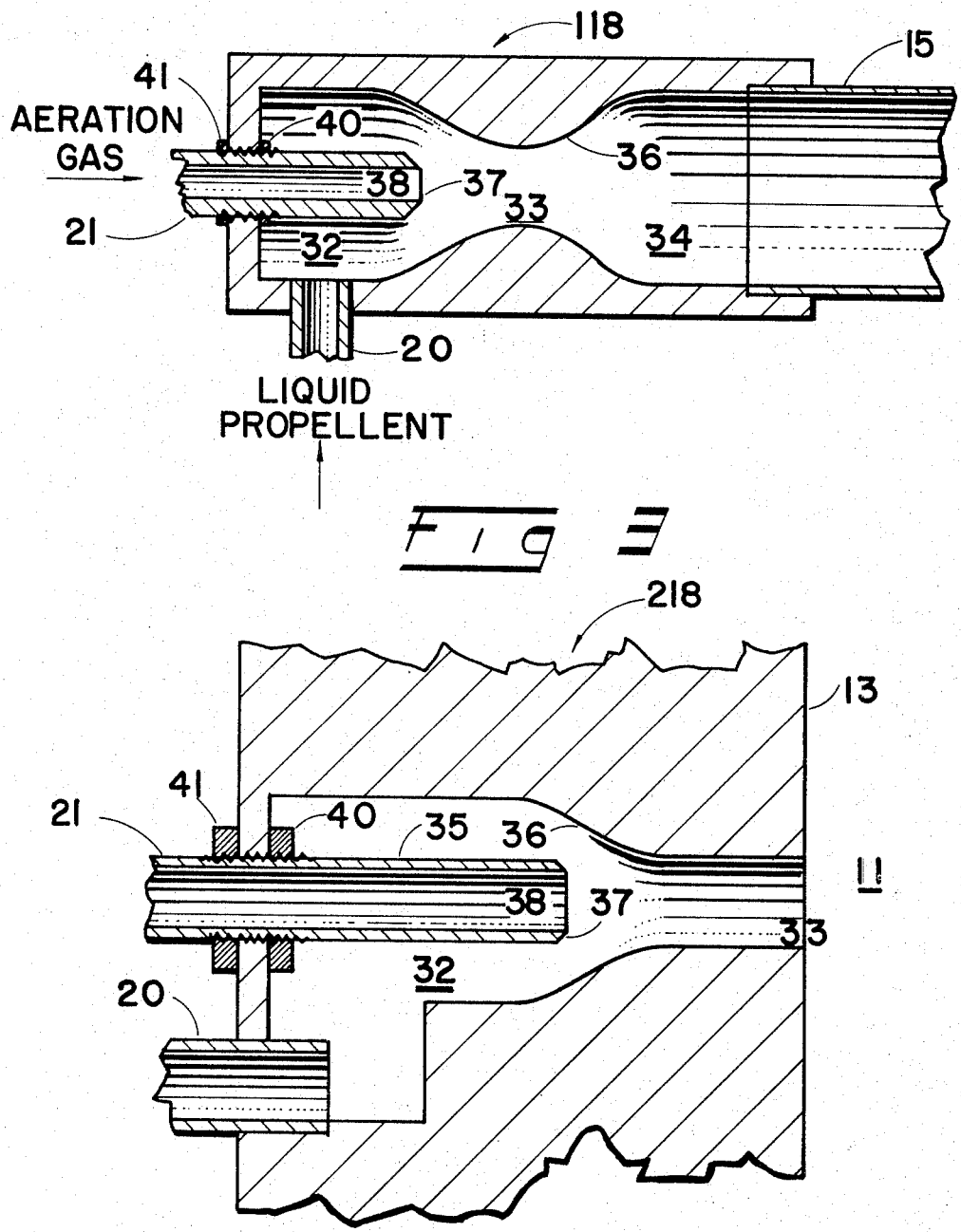

BILL P. COOPER
*INVENTOR.*

BY *Steven F. Stone*

ATTORNEY

United States Patent Office 3,365,889
Patented Jan. 30, 1968

3,365,889
PROPELLANT AERATION SYSTEM
Bill P. Cooper, Saratoga, Calif., assignor to United Aircraft Corporation, East Hartford, Conn., a corporation of Delaware
Filed May 27, 1964, Ser. No. 370,419
2 Claims. (Cl. 60—204)

This invention relates to propellant feed systems for rocket motors and in particular to an improved method for aeration of liquid propellants for thrust modulation purposes.

The throttling of liquid propellant motors has been accomplished in the past by using mechanical devices for opening and closing mass rate of flow control valves upstream of the combustion chamber injectors. A more advanced system of throttling, however, alters the mass rate of flow of the propellant by means of injecting therein gaseous media which foams or aerates the propellant within the feed lines, thereby producing a two-phase fluid for injection into the combustion chamber. The thrust level of the motor is dependent, therefore, upon the ratio of gas to propellant in the two-phase mixture.

However, the aeration technique for bulk density modification has encountered certain problems such as the tendency of the gas to mix in a nonuniform manner with the propellant, thereby forming large bubbles within the line, and the reverse flow of liquid propellant in its supply lines when the pressure of the aeration gas becomes greater than that of the liquid propellant. When this occurs the engine flames out since only the aeration gases are reaching the combustion chamber.

The present invention, however, employs a unique system for aeration whereby the problems of improper mixing of the two phases and reverse flow of liquid propellant are eliminated.

Thus, an object of this invention is to provide a system of propellant aeration whereby the distribution of the aeration medium in the liquid propellant phase is substantially improved.

A further object of the present invention is to provide a system of propellant aeration whereby the reverse flow of liquid propellant in propellant supply lines is substantially mitigated.

Other and many of the attendant advantages of this invention will be readily appreciated as the same becomes better understood by reference to the following detailed description when considered in connection with the accompanying drawings wherein:

FIG. 3 is a cross-sectional view of the aeration device of the present invention;

FIG. 4 is a cross-sectional view of an alternative structure of the aeration device of the present invention;

Figure 1:
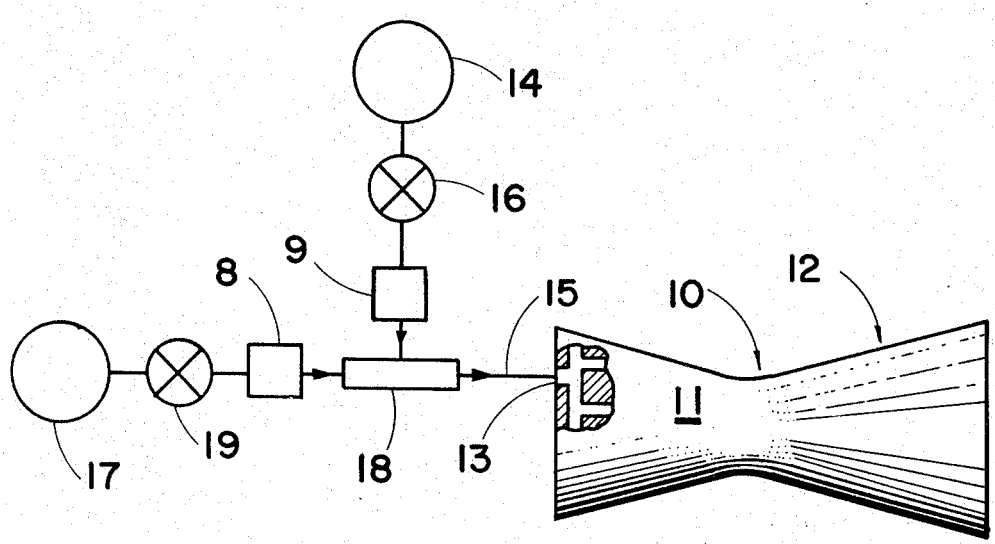
FIG. 1 represents a schematic diagram of a liquid rocket motor employing aeration techniques for thrust modulation.

Referring now to the drawings wherein like reference characters designate like or corresponding parts throughout the views, there is shown in FIG. 1 a typical rocket motor employing propellant aeration as a means for varying the thrust level of the engine. Rocket motor 10 is comprised of combustion chamber 11 and nozzle 12 and having injection ports for fuel and oxidizer at the forward end thereof of which injector 13 is exemplary.

Only the supply system for one propellant is shown in FIG. 1 and an identical feed system for the second propellant will be required in a bipropellant motor. The propellant flow is initiated by opening valve 16; the mass rate of flow of the propellant reaching injector 13 is then regulated by injecting selective quantities of gas from tank 17 into aeration device 18 by controllably varying the setting of gas flow valve 19. The gas which is injected into the propellant in the aeration device 18 mixes with the propellant in order to decrease its bulk density so that the quantity of propellant injected into the combustion chamber 11 per unit of time is an inverse function of the opening of valve 19.

Figure 2:
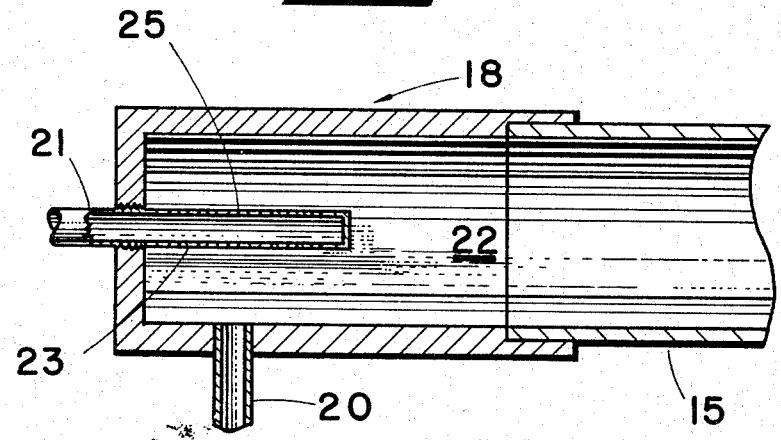
FIG. 2 is a cross-sectional view of a conventional aeration device.

FIG. 2 shows in greater detail the construction of the prior art aeration device 18 wherein the gas and propellant are mixed for propellant bulk density modification. The propellant, after passing through flow control valve 16 and check valve 9, flows from conduit 20 into cavity 22 of the aerator. Under maximum thrust conditions, the propellant contained in conduit 20, cavity 22 and propellant feed line 15 is identical in consistency and contains no entrained bubbles of injected gas. In order to reduce the motor thrust level by altering the bulk density of the propellant, gases from line 21 are injected into cavity 22 of the aerator via openings 25 in tube 23. However, when large quantities of gas are injected for deep throttling of the motor, it has been found that the gases entering through line 21 will back up into line 20 and substantially stop the flow of all propellant through the aerator 18. Consequently, the only fluid passing through line 15 is the aeration medium causing flame out of the rocket motor.

It is obvious, therefore, that with this system a delicate balance must be maintained between the pressure in the propellant line 20 and the pressure in the gas line 21, since any overpressure of the propellant feed system can cause the gas to backup into gas supply line 2, and, conversely, as mentioned above, if the pressure of the gas exceeds that of the propellant, the gas will force its way into the propellant feed line 20 cutting off the flow of the propellant. Attempts have been made to provide the lines 20 and 21 with check valves 9 and 8 in order to prevent the backup of the respective fluid. However, this does not eliminate the problem of inadvertent stoppage of the propellant or gas flow, since all the check valves accomplish is the mitigation of deep penetration of counterpart fluid into the supply line.

In analyzing the pressure conditions in the propellant feed system as shown in FIG. 1, it is obvious that the propellant injected at injector 13 must be at a pressure in excess of that of the combustion chamber. Normally, to avoid combustion instability, it is necessary to maintain the pressure of the propellant in feed line 15 at approximately 10 percent above that of the combustion chamber 11. It is necessary, therefore, that the energy means for flowing the propellant, whether it be gas pressure tanks or fluid pumps, must provide the propellant at a pressure at least 10 percent in excess of that in the combustion chamber. By the same token, in order for the aeration gas to be injected into the propellant, it was necessary that the gas be at a pressure in excess of that of the propellant. In spite of this greater pressure of the gas, it has been found that as long as the quantities of gas injected into the propellant are relatively small, the tendency for the propellant to back up into the propellant supply line is negligible. However, as soon as relatively large quantities of aeration medium are injected into the propellant for deep throttling, it has been found that the gas tends to back up the flow of propellant, stopping the propellant flow altogether. Consequently, this undesirable effect imposes a severe limitation on the lower limits of throttling by aeration.

Referring now to FIG. 3, there is shown an aeration device 118 having aeration-gas supply line 21 and feed line 15 connected at the terminal ends with liquid propellant fed into cavity 32 via supply line 20. Within cavity 32, the supply line 21 for the gas forms gas-injector tube 35 which opens in proximity to cavity constriction 36. The cavity within the device has three cross-sectional areas 32, 33 and 34 wherein area 33 is a minimum point defined by constriction 36. When the propellant is flowing through the aeration device 118 in order to produce maximum thrust, the propellant flows into cavity 32 at a predetermined pressure and velocity. However, as the propellant flows through constricted cavity 33, the velocity substantially increases and the pressure, in accordance with the Bernoulli effect, is substantially decreased. Then, as the propellant passes constriction 36 and back into relatively large cavity 34, the pressure again increases as the velocity decreases. As pointed out above, the pressure at this point must be approximately 10 percent in excess of that in the combustion chamber. However, the pressure at the point of maximum constriction may be substantially less than that of the combustion chamber. Consequently, by injecting the aeration medium into the propellant at the point of constriction, the situs of lowest system pressure, it has been found that the gas may be at a lower supply pressure than the propellant and still be readily injected. It has been found that liquid propellant in flowing around the tube 35 draws a sufficient vacuum across orifice 38 to permit the use of gases at pressures lower than that of the propellant. On the other hand, it has been found that where the aeration gas is at a pressure in excess of that of the liquid propellant, there is no tendency for the aeration gas to back up into the liquid propellant feed line 20 since the aeration gas flow, likewise, creates a vacuum condition at the annular orifice defined by constriction 36 and tube tip 37, thereby tending to draw the propellant into the cavity 33 rather than repell it.

Consequently, no matter whether the pressure of the aeration gas or the liquid propellant is somewhat in excess of the other, the one fluid will now flow into the supply lines of the other even though substantially all the fluid flowing into line 15 is either gas or propellant. As a result, massive aeration is permissible without cutting off the flow of liquid propellant.

Figure 6:
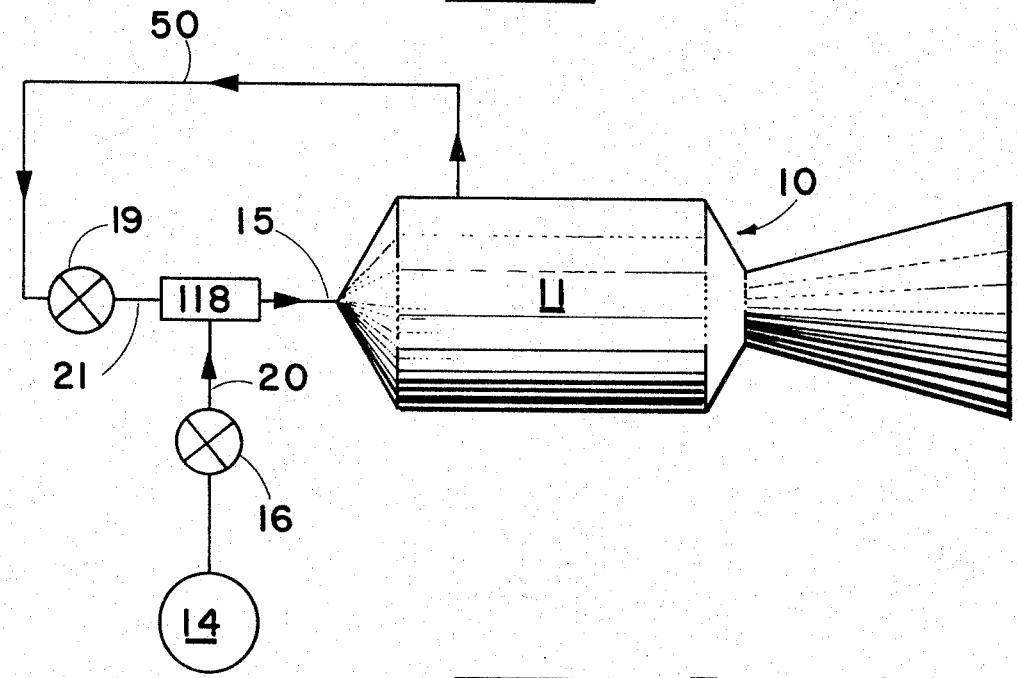
FIG. 6 is a schematic block diagram of a liquid rocket motor employing an aeration device according to this invention.

As mentioned above, the aeration gas in line 21 may be maintained at a pressure below that of the propellant in cavity 32. In fact, as shown in FIGURE 6, it has been found possible to use gases directly from the combustion chamber 11 of the motor 10 as an aeration medium, since the energy supplied by the liquid propellant pump or pressure source acts to create a sufficient vacuum in the orifice 38 of tube 35 to permit effective aeration by the low pressure gas. Thus rather than connecting line 21 to a separate source of aeration gas as in FIGURE 1, line 21 is connected through valve 19 to line 50 which is in gas communicating relationship with combustion chamber 11.

Also, it has been found that extraordinarily high mass flow rates of high pressure gas are permissible without choking the venturi 33, permitting, therefore, exceptionally deep aeration of the propellant with no danger of feedback into feed line 20.

In addition, it has been found that because of the central injection of the aeration gases into the flowing liquid propellant, the mixing of the gas in the propellant is substantially improved. The gases are found to be homogeneously distributed throughout the fuel by virtue of the drastic mixing effect encountered at orifice 33. As a consequence, by using the injection system of the present invention, a more uniform distribution of the gaseous phase in the two-phase mixture is realized.

Although aeration device 118 may be used at a point substantially upstream of the point of injection, it is permissible to have the aeration device located directly at the injector face at the head end of the combustion chamber of the rocket motor. One such design at the maximum forward position is shown in FIG. 4 wherein the aeration device 218 is integral with the injector 13 and constriction 36 is coincidental with the injector face. The operation of aeration device 218 is substantially identical with that of aeration device 118. The principal advantage, however, is that increased fluid velocity is effected at orifice 33 causing a high velocity spray pattern.

With the aeration device of the present invention at maximum gas flow, the gas will tend to draw with it a predetermined quantity of propellant. This predetermined quantity of propellant establishes the minimum mass rate of flow of propellant into the combustion engine and, therefore, the minimum thrust level thereof. The exact quantity of the propellant which will be caused to flow under maximum gas injection conditions will be dependent upon a variety of conditions such as the size of the orifice at 33, the relative position of tube tip 37 to constriction 36, tube orifice size 38, pressure of the propellant and the viscosity of the propellant. Consequently, the minimum thrust level desired for a specific motor system will dictate the values for these various physical parameters. Of these physical dimensions, the most readily adjusted is the relative position of the tube tip 37 from the point of orifice 33. This distance can be varied for a specific system by means of adjustment nuts 40 and 41 as shown in FIGS. 3 and 4.

Figure 5:
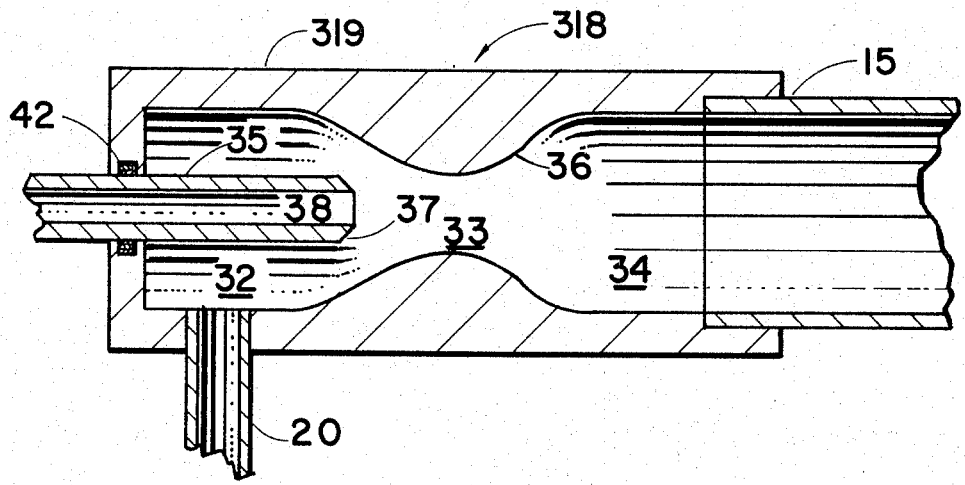
FIG. 5 is a cross-sectional view of an adjustable aeration device of the present invention.

However, if it is desirable to permit maximum throttling flexibility, then, as shown in FIG. 5, tube 35 should be capable of movement during operation. In order to achieve this end, tube 35 is connected to housing 319 by means of appropriate pressure seal 42. Consequently, should it be desired to permit maximum flow rates of propellant through the aeration device 318, tube 35 will be withdrawn to the far left to minimize the resistance to propellant flowing through cavity areas 32 and 33. However, once aeration is commenced, it is possible to further reduce the mass flow rate of propellant by moving tube 35 to permit close spacial relationship between tip 37 and constriction 36 creating a minimum annulus for propellant flow. By so doing, unusually wide ranges of throttling are possible, since extremely deep aeration is permissible without clogging the flow of propellant. In fact, at the extremely high mass flow rates of gas through orifice 38, when tube tip 37 is almost touching constriction 36, the tendency will not be to force propellant back into line 20, but quite the converse: the rapidly flowing gases will tend to continually draw propellant through the minimum annulus defined by the tube tip 37 and constriction 36.

Alternative to the particular system described herein, it is permissible to locate the gas injection tube 35 in a variety of positions. The essential feature is that orifice 38 must be located in proximity to low pressure situs 33 in order to achieve the desired effect of the present invention. Also, it is apparent that a variable venturi may be used in lieu of the fixed venturi described above to effect greater flexibility and that multiple venturis may be employed to produce the desired result.

Obviously, many modifications and variations of the present invention are possible in light of the above teachings, and therefore, it is to be understood that within the scope of the attendant claims, the invention may be practiced otherwise than as specifically described.

I claim:
1. A method for thrust modulation of a reaction motor comprising the steps of:
 (a) pressurizing a fluid propellant
 (b) flowing said fluid propellant through a feed line to a reaction motor combustion chamber
 (c) combusting said fluid propellant in said combustion chamber whereby combustion gases are produced
 (d) creating in said feed line a pressure lower than the pressure in said combustion chamber and,

(e) controllably injecting a portion of said combustion gases into said feed line at the situs of lower pressure whereby said fluid propellant is aerated by said combustion gases.

2. A rocket motor comprising:
(a) a combustion chamber
(b) a supply of liquid propellant
(c) fluid conducting means for flowing said propellant to the combustion chamber and,
(d) means for varying the flow rate of said propellant to said combustion chamber whereby the rate of production of combustion gases in said combustion chamber may be reduced, said means for varying the flow rate comprising pressure reducing means for creating a pressure in said fluid conducting means lower than in said combustion chamber and means for controllably injecting combustion gases from said combustion chamber into said fluid conducting means at the location of said pressure reducing means whereby said liquid propellant may be aerated by said combustion gases.

References Cited

UNITED STATES PATENTS

| | | | |
|---|---|---|---|
| 2,325,242 | 7/1943 | Gordon | 137—604 |
| 2,569,857 | 10/1951 | Jaegle et al. | 137—604 |
| 2,794,447 | 6/1957 | Spitz | 137—604 |
| 3,045,424 | 7/1962 | Morrell | 60—35.3 |
| 3,166,900 | 1/1965 | Stegen | 60—35.3 |
| 3,200,457 | 8/1965 | Wagstaff | 137—13 X |
| 3,257,799 | 6/1966 | Goalwin | 60—39.03 |

CARLTON R. CROYLE, *Primary Examiner.*

MARK M. NEWMAN, *Examiner.*

D. HART, *Assistant Examiner.*